United States Patent [19]

Inagaki

[11] Patent Number: 4,470,680

[45] Date of Patent: Sep. 11, 1984

[54] WATER-PROOF PHOTOGRAPHIC CAMERA WITH AN AUTOMATIC FOCUSING DEVICE

[75] Inventor: Tetsuhiko Inagaki, Sakai, Japan

[73] Assignee: Minolta Camera Kabushiki Kaisha, Toyonaka, Japan

[21] Appl. No.: 532,856

[22] Filed: Sep. 16, 1983

[30] Foreign Application Priority Data

Sep. 21, 1982 [JP] Japan .................................. 57-165399

[51] Int. Cl.³ .......................... G03B 3/00; G03B 17/08
[52] U.S. Cl. ...................................... 354/402; 354/64
[58] Field of Search .......................... 354/402, 403, 64

[56] References Cited

U.S. PATENT DOCUMENTS 4,168,897  9/1979  Gates ...................................... 354/64

FOREIGN PATENT DOCUMENTS 74527  6/1980  Japan ..................................... 354/64

Primary Examiner—Russell E. Adams
Attorney, Agent, or Firm—Watson, Cole, Grindle & Watson

[57] ABSTRACT

In a water-proof photographic camera with an automatic focusing device, a taking lens will be moved to a best-in-focus position by the automatic focusing device when it is detected that the camera is in air enrivonment, and to a fixed focusing position corresponding to a value of camera-to-object distance that is expected to be most frequently used in underwater photography or a value of distance in accordance with an available amount of light emitted from an electric flash device when it is detected that the camera is in a water environment.

11 Claims, 7 Drawing Figures

WATER-PROOF PHOTOGRAPHIC CAMERA WITH AN AUTOMATIC FOCUSING DEVICE

BACKGROUND OF THE INVENTION

1. Field of The Invention

The present invention relates to a water-proof photographic camera which can be used in rainy weather, at the sea-side, and in the water, and more particularly, to such a water-proof photographic camera with an automatic focusing device which includes a focus condition detecting circuit for detecting the focusing condition of the camera objective lens, or an automatic range finder circuit for detecting a camera-to-object distance and which automatically adjusts the focusing of the lens in accordance with the detected focusing condition or camera-to-object distance. The focus condition detecting circuit may be of any known type, for example, that which photoelectrically detects the contrast in the image of the object formed on a predetermined focal plane. Also the automatic range finder device may be of any known type, for example, that which projects a spot light onto the object and detects from what direction the light reflected by the object is incident on the camera. Such an automatic range finder is disclosed in detail, for example, in U.S. Pat. Nos. 3,723,003 and 4,065,778.

2. Description of the Prior Art

If it is intended to provide an automatic focusing device for a water-proof camera, the following problems will occur in underwater photography. It is generally known that the camera receives only a small amount of light from an object to be photographed, since a large amount of visible light rays from the sun are absorbed in the water. It is also a well known fact that the contrast in the image of an object to be photographed is low in the water due to the uniformity of the object brightness because of the scattering of light rays. Therefore, it is practically impossible to detect the camera-to-object distance or the focus condition by detecting the contrast in image of the object to be photographed. One approach to overcome this problem is to project a visible spot light on the object to be photographed for giving a better contrast to the object. However, in practice, it is difficult to obtain the proper contrast that is necessary for detecting the camera-to-object distance or the focus condition because a large amount of light projected to the object from the camera is reduced by materials suspended in the water between the camera and the object to be photographed and by the absorption of light rays in the water as described above. Also, in the case where the water-proof camera is provided with a range finding circuit that emits infrared light and detects the camera-to-object distance by detecting the light reflected from the object, the camera receives only a small amount of reflected light from the object and always detects that the object is at infinity, since a large amount of the infrared light is absorbed by the water. Further, when a visible or infrared light is projected to the object to be photographed for the range finding, a signal representing a false camera-to-object distance may sometimes be produced when the range-finder receives light reflected from suspended materials in the water or when the suspended material has an abnormally high brightness. Thus, in underwater photography, the range finding circuit and the focus condition detecting circuit can not function normally, resulting in out-of-focus photographic pictures caused by erroneous focusing of the taking-lens.

To cope with such problems, the camera may be arranged such that, besides the automatic focusing device, a manual focusing device is provided to enable focusing to a manually set camera-to-object distance and a selector switch is provided to alternatively select one of the automatic and manual focusing devices. Thus, it is intended that when a picture is taken in an air environment the selector switch is manually switched to select the automatic mode for automatic focusing, whereas the manual focusing mode may be selected for underwater photography. However, a photographer is apt to forget to operate such a switch upon changing the photography mode, thereby conducting underwater photography with the changeover switch set in the automatic mode resulting in a high probability of an out-of-focus picture. Also, conversely, photography in an air environment with the changeover switch set in the manual mode may result in a similarly undesirable photographic picture.

SUMMARY OF THE INVENTION

One object of the present invention is to provide a water-proof camera with an automatic focusing device such that the possibility of out-of-focus pictures is minimized whether the camera is in a water or in an air environment.

Another object of an invention is to provide a water-proof camera with an automatic focusing device and which can provide best-in-focus pictures with the camera being used in an air environment and also provide in-focus pictures at a high probability with the camera being used in a water environment.

Still another object of the invention is to provide a water-proof camera which automatically detects whether the camera is in a water environment or in the air and which selects the manner of focus adjustment in accordance with the detected results.

According to the present invention, a water-proof photographic camera with an automatic focusing device includes a detecting member that detects whether the camera is in a water or in an air environment. In accordance with the detection, a taking-lens of the camera will be moved to a prescribed focal position when the camera is in a water environment, and to a best-in-focus focal position when the camera is in an air environment. In other words, the camera can perform automatically either of the above focusing operations depending upon whether it is in a water or in an air environment. This will simplify the camera operations compared with the case where the photographer must manually select either of the aforementioned focusing methods. It also eliminates the disadvantage of producing out-of-focus photographic pictures due to erroneous focusing which could be caused by the photographer's failure to do necessary manual operations that have slipped his mind. Also, according to an embodiment of the invention, the focused distance for use in underwater photography is determined to a specific value in consideration of (for example, a value of the distance that is expected to be most frequently used in underwater photography or a value of distance in accordance with an available amount of light to be emitted from a flash device, etc.) Such an embodiment is advantageous in providing in-focus pictures with a high probability in underwater photographs. In another embodiment, the detecting member is designed to discriminate between underwater photography and photography in an air environment, making use of the difference between the refractive indexes of water and air. This provides another advantage in that it can be easily detected by a simple mechanism whether the camera is in a water or in an air environment.

These and other objects, features and advantages of the invention will become more apparent upon a reading of the following detailed specification and drawings.

DETAILED DESCRIPTION OF THE PREFERRED EMBODIMENT

Figure 1:
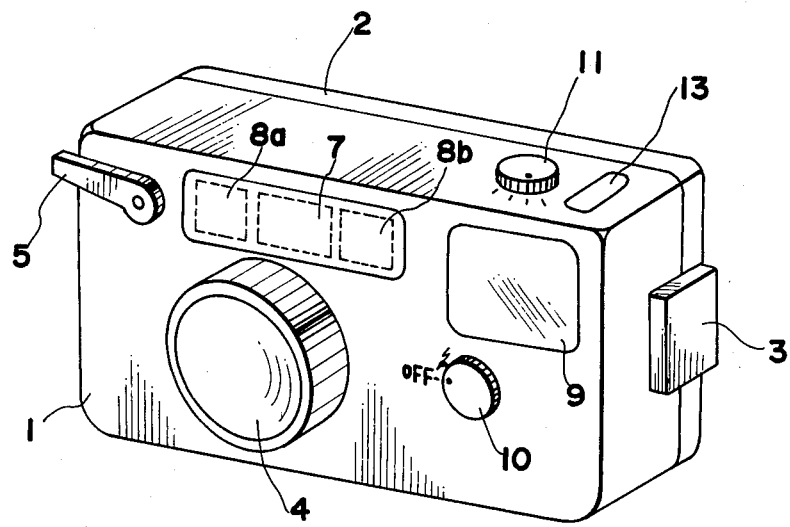
FIG. 1 is a perspective view showing an external view of a water-proof photographic camera according to a first preferred embodiment of the invention.

The photographic camera shown in FIG. 1 is provided with an automatic focusing device, a flash device for emitting auxiliary photographing light, and a winder for winding-up and rewinding a film. Both camera body 1 and rear cover 2 are provided with a water-proof structure and water-proof packings (not shown) such as O rings or the like provided between camera body 1 and rear cover 2. A lock mechanism 3 is provided at the side of camera rear cover 2 for holding camera rear cover 2 in watertight coupling with camera body 1.

Figure 2:
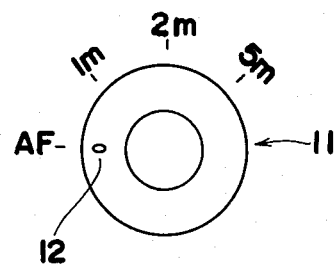
FIG. 2 is an enlarged plan view of the dial shown in FIG. 1.

For replacing the film or the battery, locking mechanism 3 is released to allow the opening of camera rear cover 2. On the front surface of camera body 1 are provided window 4 for the camera objective, shutter release lever 5, viewfinder window 7, two windows (8a) and (8b) for range finding or detection of focus condition, flash light emitting window 9 and dial 10 for activating the flash device installed in the front portion of camera body 1. Also, on the top of the camera are provided a dial 11 to be operated manually for the selection of the automatic focusing of the camera objective to a position depending upon the object distance or the manual focusing of the same to any positions where the lens is focused on a point at the set or selected object distance. Detecting member 13 is also provided on the camera top, for detecting whether the camera is in a water or in an air environment. The selection of the manner of the focusing may be made, for example, as shown in FIG. 2 by rotating dial 11 and bringing index 12 thereon into registration with either mark AF for automatic focusing, or with any one of legends M1, M2 or M3 for manual focusing.

Figure 3:
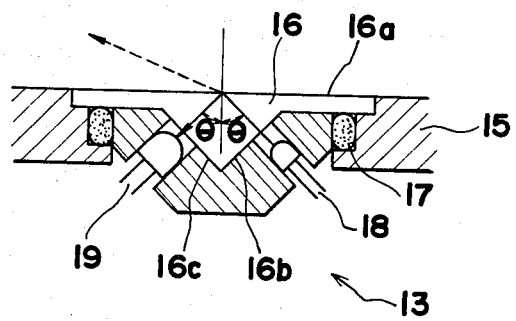
FIG. 3 is a cross sectional view showing the construction of the detecting member shown in FIG. 1.

With reference to FIG. 3 showing a cross sectional view of the construction of the above detecting member 13, the portion below the structure shown in the Figure is the interior of camera body 1. Detecting window 16 is composed of a transparent plastic material such as methacrylate resin, and its outer surface 16a is to be in direct contact with the air or the water. This detecting window 16 is secured to water-proof cover 15 of camera body 1 through O ring 17 as a water-proof packing. Also, a photocoupler comprising a light emitter 18 and a photodetector 19 is installed adjacent to detecting window 16 under the window 16. The lower part of detecting window 16 is formed with a V-shaped projection as shown which is defined by two planes 16b and 16c. The plane 16b is at a right angle to the optical axis of light emitter 18 and the plane 16c is likewise perpendicular to the optical axis of photodetector 19. It will be noted that light emitter 18 and photodetector 19, and the V-shaped projection of detecting window 16 are arranged such that the light beam emitted from light emitter 18 will be incident on plane 16a of detecting window 16 at an angle of incidence of approximately 50 degrees, and the light beam will be reflected at plane 16a to photodetector 19 at an angle of reflection that is the same as the angle of incidence. It is to be understood that light emitter 18 and photodetector 19 may respectively be a light emitting diode and photodiode both of which are composed of the same semiconductor material, for example silicon, and having a spectral distribution of the emitted light and a spectral sensitivity extending approximately in the same region, for example, in the infrared region.

The operations of detecting member 13 constructed as described above will now be explained hereinbelow. First, when the camera is in an air environment, the upper surface of detecting window 16 is in contact with the air having a refractive index of one. On the other hand, detecting window 16 is composed of methacrylate resin having a refractive index of 1.49. Accordingly, the critical angle $\alpha$ of methacrylate resin with respect to the air can be expressed by the following formula:

$$\alpha = \sin^{-1}(1/1.49) \approx 42°$$

This means that all of the light beam irradiated from light emitter 18 and impinging on upper plane 16a of detecting window 16 at the angle of incidence of 50 degrees is totally reflected at the plane and received by photodetector 19. When the camera is in a water envoronment, the outer surface of detecting window 16 is in contact with the water having a normal refractive index of approximately 1.33. Accordingly, the critical angle $\beta$ of methacrylate resin with respect to the water can be represented by a following formula:

$$\beta = \sin^{-1}(1.33/1.49) \approx 63°$$

This means that the light beam emitted from light emitter 18 and impinging on upper plane 16a of detecting window 16 at an angle of incidence of 50 degrees partially passes through to the outside of the camera as shown by the broken line so that a substantial portion of the light rays emitted from light emitter 18 are not received by photodetector 19. It will be noted that in both cases described above, a small amount of natural light may enter photodetector 19 from outside of the camera but such light is negligible compared with the light emitted from light emitter 18. Accordingly, it is assumed that photodetector 19 is unable to detect such small amount of natural light as will be described later. Thus, the system detects that the camera is in an air environment, when photodetector 19 receives the light rays emitted from light emitter 18, and detects that the camera is in the water, when photodetector 19 receives no such light rays.

It will also be noted that the angle $\theta$ to be provided by the arrangement of the light emitter 18 and photodetector 19 may not necessarily be limited to the above value of 50 degrees but the angle $\theta$ may well be between $\alpha$ and $\beta$ wherein $\alpha$ and $\beta$ are the critical angles of the window-material with respect to the refractive indexes of water and air, namely $\alpha < \theta < \beta$. As described above when detecting window 16 is composed of methacrylate resin, the angle $\theta$ of incidence may be determined to an appropriate value between 42° and 63°. The material of detecting window 16 is not necessarily limited to methacrylate resin but, needless to say, another type of plastic resin or glass or the like may also be employed. The above angle $\theta$ should be selected in dependence on the critical angles of those materials. Further, as an alternative for those materials used for detecting window 16, an optical filter may be employed that passes only the light component in a specific wave length range, namely, a filter that passes only the light emitted from light emitter 18. Also, in the previously described embodiment, whether the camera is in an air or in a water environment was detected by detecting whether or not the reflected light emitted from light emitter 18 was received by photodetector 19. Needless to say, this may well be performed alternatively by another detecting structure. Namely, the camera may be provided with a light guiding hole in front of the window 16 so that detecting window 16 will receive the exterior light only at a prescribed angle of incidence and photodetector 19 is located to receive the incident exterior light only when the camera is in an air environment due to the difference of the refractive indices between water and air in the hole. Instead of the optical construction described above, a mechanical or electrical means may be provided that includes a pressure detecting member exposed to the outside of the camera and mounted on the camera such that either the member mechanically moves or the value of its electrical parameter varies in accordance with the pressure applied thereto and detects that the camera is in a water environment when the detecting member detects the water pressure.

Figure 4:
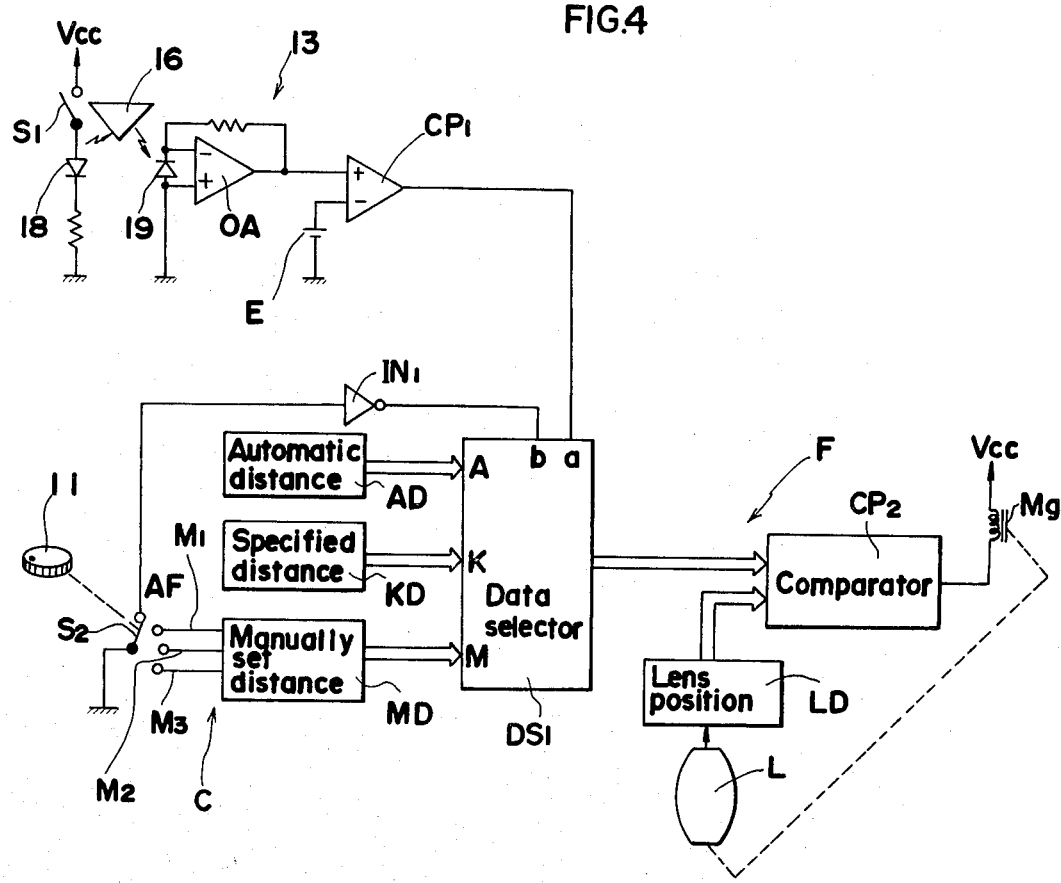
FIG. 4 is a block diagram showing the electronic circuit according to the above embodiment of the invention.

The following description pertains to the construction and operation of the control circuit system of the water-proof camera according to an embodiment of the present invention shown in FIG. 4. In detecting member 13, detection starting switch S1 is normally open and is closed at the initial stage of the depressing operation of shutter release lever 5. When switch S1 is closed, light emitting diode 18 will be energized and emits, for example, infrared light towards detecting window 16. Photodiode 19 is connected between the two input terminals of operational amplifier OA the output of which is fed back to one of the input terminals via a resistor. With the construction so far described, an output voltage proportional to the intensity of the light received by photodetector 19 is generated at the output terminal of operational amplifier OA. Comparator CP1 compares the output voltage from operational amplifier OA with a prescribed reference voltage from voltage source E. When the output of the amplifier becomes higher than the reference voltage, comparator CP1 produces a high level output "H". It should be understood that the reference voltage from voltage source E is determined to be higher than the output voltage corresponding to the intensity of the light incident on photodetector 19 from the outside of the camera via the detecting window 16, but is lower than the voltage corresponding to the intensity of light emitted from light emitter 18 and received by photodetector 19 due to the reflection at detecting window 16. As described above, when the camera is in an air environment, the light emitted from light emitter 18 is received by photodetector 19, and when the camera is in a water environment, a substantial amount of the light emitted from light emitter 18 is not received by photodetector 19 due to the optical characteristics of detecting window 16. Accordingly, comparator CP1 produces a high level output voltage "H" and a low level output voltage "L", respectively, when the camera is in an air environment and when the camera is in water environment.

In focus selecting section C, the common contact of switch S2 is grounded, and contacts AF, M1, M2 and M3 are alternatively grounded in accordance with the rotational position of dial 11. Selecting terminals a and b of data selector DS1 receive the output from comparator CP1 and the output from contact AF via inverter IN1, respectively. In accordance with the combination of the two levels of the received output, data selector DS1 alternatively delivers object distance data received via three input terminals A, K and M from automatic distance information generating circuit AD, specific distance data generating circuit KD and manually set distance data generating circuit MD. In this arrangement, automatic distance data generating circuit AD as the first signal generating means may be a known automatic range finding circuit that automatically measures camera-to-object distance and delivers object distance data as an output to input terminal A of data selector DS1. Specific distance information generating circuit KD, as the second signal generating means, delivers data of a predetermined object distance (for example, 1.5 m as an object distance most frequently used in underwater photography). It will be noted that this specific object distance may be determined by taking into account the focal length of the taking-lens or the available light amount to be emitted from the flash device incorporated in the camera. Another manually set distance data generating circuit MD, as a third signal generating means, has input terminals connected with contacts M1, M2 and M3 and switch S2, and one of the three distance data representing focusing on points at 1 m, 2 m and 5 m will be delivered at the output terminal of the circuit depending upon which of the three contacts M1, M2 and M3 has been connected to the common contact by means of manually rotating dial 11.

The input/output relationship of data selector DS1 is determined as shown in Table-1 presented below.

Data selector DS1 always delivers found range data from automatic distance data generating circuit AD regardless of the setting position of dial 11 when the camera is in an air environment. Also, data selector DS1 delivers specific distance data from specific distance data generating circuit KD when the camera is in a water environment with dial 11 set to position AF, and a set distance data from manually set distance data generating circuit MD in accordance with the set one of the three setting positions M1, M2 and M3 when the camera is in a water environment with dial 11 set to one of the above three setting positions.

TABLE 1

| a INPUT | b INPUT | OUTPUT |
|---------|---------|--------|
| H | H | A |
| H | L | A |
| L | H | K |
| L | L | M |

Figure 5:
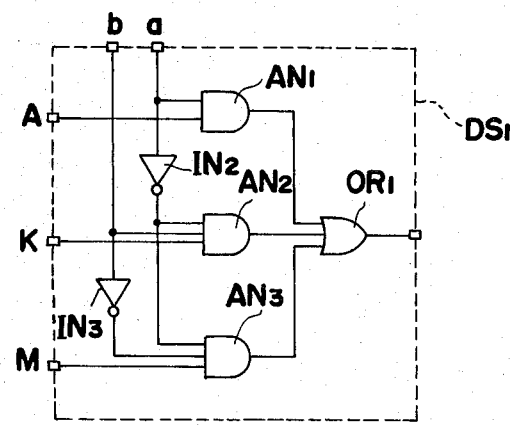
FIG. 5 is a circuit diagram showing an exemplary embodiment of the data selector portion of the circuit shown in FIG. 4.

In practice, data selector DS1 consists of a logic circuit as shown in FIG. 5. In the Figure, selecting terminal a is connected to one input terminal of AND gate AN1, and also is connected to first input terminals of AND gates AN2 and AN3 via inverter AN3. Selecting terminal b is connected to the second input terminal of AND gate AN2 and, is also connected to the second input terminal of AND gate AN3 via inverter IN3. On the other hand, input terminals A, K and M that receive the object distance data from the respective distance data generating circuits are connected to the other input terminal of AND gate AN1, to the third input terminal of AND gate AN2, and to the third input terminal of AND gate AN3, respectively. All of the output terminals of AND gates AN1, AN2 and AN3 are connected to the input terminal of OR gate OR1, and the output terminal of OR gate OR1 is connected to one input terminal of comparator CP2 that is included in a focusing member to be described later. The operation of circuit DS1 will now be briefly described. A selected one of the AND gates AN1, AN2, and AN3 will be unblocked or enabled in response to a "H" or "L" level signal provided through selecting terminals a and b, and the distance data provided through the input terminal connected to the selected gate is delivered as a distance data for focusing via OR gate OR1.

In focus control section F in FIG. 4, one input terminal of comparator CP2 receives the above object distance data that is fed from data selector DS1, the other input terminal of comparator CP2 receives the object distance data fed from lens position data generating circuit LD and the output terminal of comparator CP2 is connected with an electromagnet MG for electromagnetically attracting the arresting member that stops the operations of the driving mechanism, to be described later. Camera objective lens L is associated with a driving mechanism (not shown) that is initiated at the last stage of the depression operation of shutter release lever 5 and drives taking-lens L, for example, from the closest distance focused position towards the infinity focused position. Objective lens L is also associated with a lens position data generating circuit LD that delivers lens position data representative of a driven position of objective lens L. Comparator CP2 starts its operation at the last stage of the depression of shutter release lever 5 and inverts its output to a "L" level to energize electromagnet Mg and inverts its output level to high level "H" de-energizing for electromagnet Mg when the data input to both input terminals of comparator CP2 are in coincidence with each other. The arresting member (not shown) is actuated by the de-energization of electromagnet Mg and stops the driving mechanism so that objective lens L is adjusted to a position commensurate with the distance data fed from data selector DS1. Thus, detecting member 13 detects whether the camera is in an air or water environment at the initial stage of depression of the shutter release lever 5. Focusing is adjusted as desired by the actuation of focusing control section F at the last stage of depression of the shutter release lever 5, in dependence on the lens position data that has been determined according to the detection by the detecting member 13 and setting of the dial 11. That is, when the camera is in an air environment the objective lens is brought into an in-focus position in accordance with the found range data supplied from automatic distance data generating circuit AD, regardless of the setting position of dial 11. On the other hand, when the camera is in a water environment with dial 11 set erroneously to position AF, the focusing is automatically adjusted to a specific distance such as a distance that is most frequently used in underwater photography, or the available light amount to be emitted from a flash device thereby minimizing the probability of producing out-of focus photographic pictures.

Figure 6:
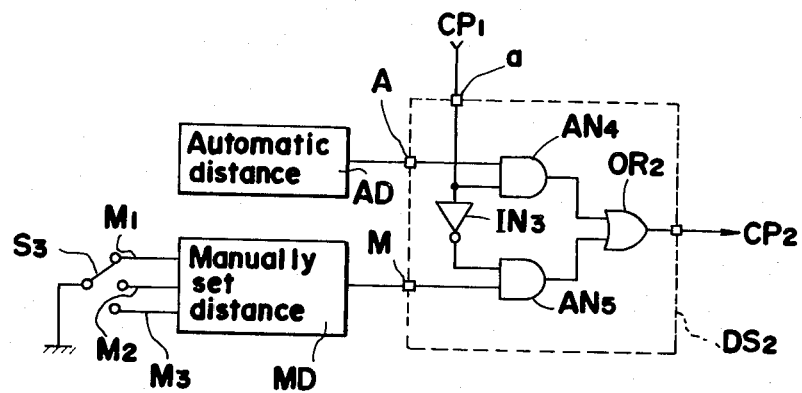
FIG. 6 is a circuit diagram of a second embodiment that is partially modified from the circuit shown in FIG. 4 and showing only the modified portion thereof.

FIG. 6 shows the principal portion of a water-proof camera in accordance with the second embodiment of the present invention, that is, the portion of the circuit for focus selecting section C of the embodiment. In the embodiment, the function for selecting a specific distance is omitted and the system is designed such that the focusing in underwater photography is always adjusted to a manually set distance. This is the point that is different from the previously described embodiment. In this embodiment, the same reference characters are employed for the components which correspond to those in the embodiment described above and the detailed description of them is hereby omitted. In FIG. 6 switch S3 has a common contact that is grounded, and one of the contacts M1, M2 and M3 is alternatively selected according to the rotational position of the selection dial (not shown). It will be noted that in the present embodiment, contact AF in the previously described embodiment is omitted. The output from comparator CP1 applied to data selector DS2 is delivered to selecting terminal a, and data selector DS2 alternatively delivers, in accordance with the above output, data that is fed to its input terminals A and M from automatic distance data generating circuit AD and manual setting distance data generating circuit MD. The input/output relationship of data selector DS2 is determined as shown in Table 2, so that when the camera is in an air environment, found range data from automatic distance data generating circuit AD will be delivered, and when the camera is in a water environment, a set distance information in compliance with the set position of the dial and fed from manually set distance data generating circuit MD will be delivered in a similar manner.

TABLE 2

| a INPUT | OUTPUT |
|---------|--------|
| H | A |
| L | K |

It will be noted that data selector DS2 has a selecting terminal a connected to one input terminal of AND gate AN4 and to one input terminal of AND gate AN5 through inverter IN3, and input terminals A and M that receive distance data from the distance data generating circuits are connected to the other input terminals of AND gate AN4 and AN5 respectively. Additionally, the output terminals of AND gates AN4 and AN5 are connected to both input terminals of OR gate OR2, and the output terminal of OR gate OR2 is connected to the input terminal of comparator CP2. By virtue of the data selector DS2, the system operates in such a way that when the camera is in an air environment, AND gate AN4 will be unblocked so that range finding data from the input terminal A is delivered through OR gate OR2, and when the camera is in a water environment, AND gate AN5 will be unblocked so that set distance data from input terminal M is delivered through the same OR gate OR2. Namely, when the camera is in an air environment, the focusing is adjusted in accordance with the found range data supplied from automatic distance data generating circuit AD regardless of a manually set distance provided by the dial operation, and when the camera is in a water environment, the focusing will be adjusted to the manually set distance by the dial setting operation.

Figure 7:
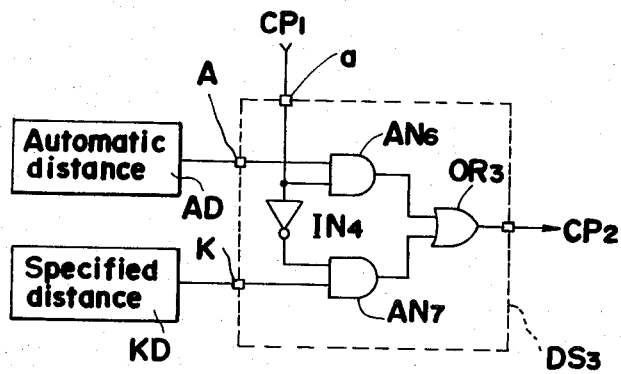
FIG. 7 is a circuit diagram of a third embodiment of the invention that is partially modified from the circuit in FIG. 4 and showing only the modified portion thereof.

FIG. 7 shows the principal portion of the modification of the water-proof camera in accordance with a third embodiment of the present invention, namely a circuit showing still another circuit construction to be employed for focus selecting section C. In the embodiment, the function that adjusts the focusing to any manually set distance is omitted, instead, the system is designed such that the focusing is always adjusted to a specific distance. This is the point that is different from the embodiment shown in FIG. 4. It will be noted that the same reference characters are employed for the elements having the identical construction as those of the corresponding elements in FIG. 4, and detailed description of them is hereby omitted. In FIG. 7, data selector DS3 has a selecting terminal a that receives the output from comparator CP1, and alternatively delivers the distance data that is delivered to input terminals A and K from automatically detected distance data generating circuit AD and specific distance data generating circuit KD, respectively, in accordance with the level of the output from comparator CP1. The input/output relationship of data selector DS3 is determined as shown in Table 3 so that found range data from automatic distance data generating circuit AD or specific distance data from specific distance data generating circuit KD is delivered depending upon whether the camera is in an air or in a water environment.

TABLE 3

| a INPUT | OUTPUT |
|---------|--------|
| H | A |
| L | K |

It will be noted that the detailed description of the circuit of the data selector DS3 has been omitted since the circuit may be similar to the one shown in FIG. 6. However, a brief description of the circuit is as follows. When the camera is in an air environment, AND gate AN6 will be unblocked so that range finding data will be delivered through OR gate OR3; and when the camera is in a water environment, the gate of AND gate AN7 will be unblocked so that a specific distance data from input terminal K is delivered through the same OR gate OR3. That is, when the camera is in an air environment, the focusing will always be adjusted in accordance with the found range data from automatically detected distance data generating circuit AD, and when the camera is in a water environment, focusing will be adjusted to a specific distance in accordance with an output from specific distance data generating circuit KD.

In the above embodiments, the focus control system is designed such that focus control section F (see FIG. 4) will be actuated after a found range-finding data has been obtained from automatic distance data generating circuit AD and the taking-lens will then be driven in accordance with either the found range data or a prescribed distance data. The focusing can be adjusted by comparing the lens position data corresponding to the driven position of the objective lens with the above controlled distance data to stop the driving of the lens when the compared data becomes coincident with each other. The present invention is applicable not only to the focusing system as described above but also to other types of focusing systems, for example, such a system as will stop the driving of the taking-lens when an in-focus condition is detected while the objective lens is being driven from the closest distance focused position to the infinity focused position with the object to be photographed being scanned so as to detect whether the in-focus condition is attained. In such a system, the present invention may be structured in such a way that a stopping mechanism that forcibly stops the driving of the objective lens at the position to be focused at the prescribed distance is brought into the path of a lens driving element. The automatic focusing is disabled when the camera detects that it is in a water environment, and the stopping mechanism is retracted from the driving path when the camera detects that it is in an air environment, enabling the detection of the focusing condition.

As many apparently widely different embodiments of this invention may be made without departing from the spirit and scope thereof, it is to be understood that the invention is not limited to the specific embodiments thereof except as defined in the appended claims.

What is claimed is:

1. A water-proof photographic camera with an automatic focusing device for adjusting a taking-lens to a best-in-focus position, said camera comprising:
   a detecting means for detecting whether said camera is in an air or in a water environment and generating a detected signal representing the result of the detection;
   a first signal generating means for generating a first focusing signal for adjusting said taking-lens to a best-in-focus position.
   a second signal generating means for generating a second focusing signal for adjusting said taking-lens to a given fixed focusing position;
   a selecting means, responsive to said detected signal, for selecting said first focusing signal when said camera is in an air environment and selecting said second focusing signal when said camera is in a water environment; and
   an adjusting means for adjusting said taking-lens to a position in accordance with said selected signal.

2. A water-proof photographic camera according to claim 1 wherein said first and second signal generating means respectively generate signals representing values of camera-to-object distances, and said adjusting means adjusts said taking-lens such that said taking-lens is driven to a position to be focused on an object at the distance represented by the value of said selected signal.

3. A water-proof photographic camera according to claim 2 wherein said first signal generating means includes a range finding means for measuring the distance from said camera to an object to be photographed and generating a signal representative of the measured distance, and said second signal generating means includes a third signal generating means for generating a number of signals respectively representing given camera-to-object distances to be focused by the lens and a switch means manually operable for selecting one of said number of signals.

4. A water-proof photographic camera according to claim 2 wherein said first signal generating means includes a range finding means for measuring the distance from said camera to an object to be photographed and generating a signal representative of the measured distance, and said second signal generating means includes a fourth signal generating means for generating a signal representing a specific camera-to-object distance predetermined relevant to underwater photography.

5. A water-proof photographic camera according to claim 4 wherein said fourth signal generating means generates said signal representing said specific camera-to-object distance that is expected to be most frequently used in underwater photography.

6. A water-proof photographic camera according to claim 4 wherein said fourth signal generating means generates said signal representing said specific camera-to-object distance that is predetermined in accordance with an available amount of light to be emitted from an electronic flash device.

7. A water-proof photographic camera according to claim 4, wherein said second signal generating means further includes a fifth signal generating means for generating a number of signals respectively representing given camera-to-object distances to be focused by the lens, and a switch means manually operable for selecting one of said number of signals, and said selecting means further includes a changeover switch manually operable for selecting either said first or second signal generating means, and a gate means for outputting the signal generated from said first signal generating means when said camera is in an air environment and outputting the signal generated from said fourth signal generating means when said camera is in a water environment with said changeover switch selecting said first signal generating means and the signal generated from said fifth signal generating means and selected by said switch means when said camera is in a water environment with said changeover switch selecting said second signal generating means.

8. A water-proof photographic camera according to claim 7 where said switch means includes said changeover switch.

9. A water-proof photographic camera according to claim 1 wherein said first signal generating means includes a focus condition detecting means for detecting a focus condition upon a focus adjustment of said taking-lens by detecting the contrast of an image of an object to be photographed, and said adjusting means includes an initiation means for initiating driving of said taking-lens, and a lock means for locking the driving of said taking-lens when said focus condition detecting means detects a proper focus condition.

10. A water-proof photographic camera according to claim 1 wherein said detecting means is a transparent optical material provided on the surface of said camera and having an index of refraction different than that of air and water, respectively, and photodetecting means including a photodetector for receiving at a given angle of incidence light transmitted from said optical material.

11. A water-proof photographic camera according to claim 10 wherein said optical material is a material having an index of refraction greater than that of air and water, respectively, and said photodetecting means includes a light emitter for emitting a light beam towards the outside of said camera through said optical material at a given angle of incidence according to said index of refraction, a photodetector for receiving said light beam substantially totally reflected from said optical material, a measured voltage generating circuit for generating a measured voltage corresponding to the intensity of said received light beam, a reference voltage source for generating a reference voltage, and a comparator for comparing said measured voltage and reference voltage.

* * * * *